US009266581B2

(12) United States Patent
Dal Pozzo et al.

(10) Patent No.: US 9,266,581 B2
(45) Date of Patent: Feb. 23, 2016

(54) ACTUATION DEVICE FOR A CONTROL CABLE FOR A BICYCLE GEARSHIFT

(75) Inventors: Massimo Dal Pozzo, Rotzo (IT); Giuseppe Dal Pra', Zane (IT)

(73) Assignee: Campagnolo S.r.l., Vicenza (IT)

( * ) Notice: Subject to any disclaimer, the term of this patent is extended or adjusted under 35 U.S.C. 154(b) by 637 days.

(21) Appl. No.: 13/310,438

(22) Filed: Dec. 2, 2011

(65) Prior Publication Data
US 2012/0137819 A1  Jun. 7, 2012

(30) Foreign Application Priority Data
Dec. 3, 2010  (EP) .................................... 10015246

(51) Int. Cl.
| | |
|---|---|
| *F16C 1/10* | (2006.01) |
| *G05G 1/00* | (2008.04) |
| *B62K 23/06* | (2006.01) |
| *B62M 25/04* | (2006.01) |

(52) U.S. Cl.
CPC ................ *B62K 23/06* (2013.01); *B62M 25/04* (2013.01); *Y10T 74/20438* (2015.01)

(58) Field of Classification Search
CPC ........ B62K 23/02; B62K 23/04; B62K 23/06; B62M 25/00; B62M 25/02; B62M 25/04; Y10T 74/20438
USPC ............. 74/502.2, 488, 489, 473.14, 473.15, 74/504–507, 577 R, 577 M, 577 S
See application file for complete search history.

(56) References Cited

U.S. PATENT DOCUMENTS

| | | | |
|---|---|---|---|
| 4,938,733 A | 7/1990 | Patterson | |
| 5,009,629 A | 4/1991 | Tagawa | |
| 5,203,213 A * | 4/1993 | Nagano | ...................... 74/473.14 |
| 5,400,675 A * | 3/1995 | Nagano | ........................ 74/502.2 |
| 5,676,020 A * | 10/1997 | Jordan et al. | ............... 74/473.14 |
| 5,732,593 A | 3/1998 | Hwang et al. | |

(Continued)

FOREIGN PATENT DOCUMENTS

| | | |
|---|---|---|
| CN | 1318699 A | 10/2001 |
| EP | 0849150 A2 | 6/1998 |

(Continued)

OTHER PUBLICATIONS

European Search Report, Appln. No. EP 100152461.1-1254, dated May 6, 2011.

(Continued)

*Primary Examiner* — Adam D Rogers
(74) *Attorney, Agent, or Firm* — Volpe and Koenig, P.C.

(57) ABSTRACT

The disclosed device controls a cable associated with a bicycle gearshift and is particularity configured for securing the body of the device on the forward-facing end of racing bicycle handlebars. A cable winding bobbin, having an internally toothed crown, is provided in the device's body and a drive mechanism rotates the bobbin in the chosen direction to achieve predetermined angular positions. A ratchet mechanism, located between the lever and the toothed crown, includes opposite rocker arms with cam profiles curved away from each other, and a toothed sector for engaging the toothed crown. A pointer is located to be selectively engaged with at least one of the rocker arms so that engagement results in the rocker arm's toothed section being away from the toothed crown, and disengagement results in the rocker arm's toothed section being engaged with the toothed crown.

9 Claims, 13 Drawing Sheets

(56) References Cited

U.S. PATENT DOCUMENTS

| | | | |
|---|---|---|---|
| 5,806,372 A * | 9/1998 | Campagnolo | 74/473.14 |
| 2001/0027906 A1 | 10/2001 | Assel | |
| 2002/0104401 A1 | 8/2002 | Dal Pra | |
| 2002/0124679 A1 | 9/2002 | Dal Pra | |
| 2003/0167871 A1* | 9/2003 | Irie et al. | 74/502.2 |
| 2003/0221506 A1 | 12/2003 | Wesling et al. | |
| 2006/0053941 A1 | 3/2006 | Dal Pra et al. | |
| 2007/0221008 A1 | 9/2007 | Shipman et al. | |
| 2007/0227287 A1 | 10/2007 | Righi et al. | |
| 2008/0196537 A1* | 8/2008 | Dal Pra' | 74/502.2 |

FOREIGN PATENT DOCUMENTS

| | | | | |
|---|---|---|---|---|
| EP | 1630094 | A1 | 1/2006 | |
| EP | 1837275 | A2 | 9/2007 | |
| IT | WO 2005068283 | A2 * | 7/2005 | B62K 23/06 |
| JP | H02267094 | A | 10/1990 | |
| JP | 2002225781 | A | 8/2002 | |
| JP | 2006069533 | A | 3/2006 | |
| JP | 2007230553 | A | 9/2007 | |
| JP | 2007536164 | A | 12/2007 | |

OTHER PUBLICATIONS

Chinese Office Action for Application No. 201110399136.0, issued Aug. 5, 2014, and English translation.

Decision of Grant in co-pending JP application 2011-264425, issued Aug. 4, 2015.

* cited by examiner

ACTUATION DEVICE FOR A CONTROL CABLE FOR A BICYCLE GEARSHIFT

BACKGROUND

The present invention concerns an actuation device for a control cable for a bicycle gearshift, in particular a so-called bar-end device suitable for being mounted on the forward-facing end of racing bicycle handlebars.

A bicycle is normally provided with a rear derailleur associated with the chainset, which consists of a series of coaxial gear wheels (pinions), having different diameters and numbers of teeth, fixedly connected to the hub of the rear wheel.

A bicycle is typically also provided with a front derailleur associated with the crankset, which consists of a series of gear wheels (toothed crowns) having different diameters and numbers of teeth, associated with a pin of the bottom bracket assembly set in rotation by a pair of pedals.

In both cases, the derailleur engages a transmission chain extending in a closed loop between the chainset and the crankset, shifting the chain on gear wheels having different diameters and numbers of teeth, so as to obtain different transmission ratios.

In particular, the expression downward gearshifting is used when the chain goes from a gear wheel having a larger diameter to a gear wheel having a smaller diameter, and the expression upward gearshifting when the chain moves from a gear wheel having a smaller diameter to a gear wheel having a greater diameter. Regarding this, it should be noted with reference to the front derailleur that downward gearshifting corresponds to passing to a lower transmission ratio and upward gearshifting corresponds to passing to a higher transmission ratio, vice-versa with reference to the rear derailleur, downward gearshifting corresponds to passing to a higher transmission ratio and upward gearshifting corresponds to passing to a lower transmission ratio.

The movement in the two directions of a derailleur is obtained through an actuation device mounted so as to be easily operated by the cyclist; in the case of a so-called bar-end device, mounting takes place on the handlebars, at the ends thereof.

Conventionally, the actuation device for the front derailleur is located on the left handgrip of the handlebars, and vice-versa the actuation device for the rear derailleur is located on the right handgrip.

More specifically, in a mechanical gearshift, each derailleur is moved between the gear wheels, in a first direction by a pulling action exerted by a normally sheathed inextensible cable (commonly called Bowden cable), and in a second opposite direction by releasing the traction on the cable and/or by the elastic return action of a spring provided in the derailleur itself.

Normally, the direction in which the movement is caused by the release of the traction of the cable and/or by the return spring is that of downward gearshifting; vice-versa, the pulling action of the control cable takes place in the direction of upward gearshifting, in which the chain moves from a wheel having a smaller diameter to a wheel having a greater diameter.

In the actuation device, the control cable is actuated in traction or in release through winding and unwinding on a rotor element, commonly called cable-winding bobbin, the rotation of which is controlled by the cyclist with a suitable control lever. Single-lever control is made necessary by the positioning at the end of the handlebars, where it would be complex and not very practical to use two control levers, as it occurs—on the other hand—for different types of devices, located in different parts of the handlebars.

In any case, the actuation device must ensure that the bobbin is held still in rotation in a number of predetermined angular positions, corresponding to the different positions of the derailleur required by the different ratios, i.e. on the different gear wheels of the gearshift. This function is obtained with so-called indexers, a great many types of which are known in the field, variously acting between the bobbin and the fixed casing of the device.

In more conventional so-called bar-end devices, the single-lever control acts substantially directly on the cable-winding bobbin, so that each angular position of the cable-winding bobbin, as defined by the indexing means, corresponds to a precise angular position of the control lever.

The search for better aerodynamics in a competition has led to the provision of a quite complex control device, described in EP-1837275-A2, which is intended to return into the neutral position. It is the purpose of the present invention to provide a simplified device that allows the return of the control lever into its neutral position.

BRIEF DESCRIPTION OF THE DRAWINGS

The features and advantages of the invention will fully understood from the description of preferred embodiments with reference to the attached drawings.

DETAILED DESCRIPTION

Introduction

Figure 1:
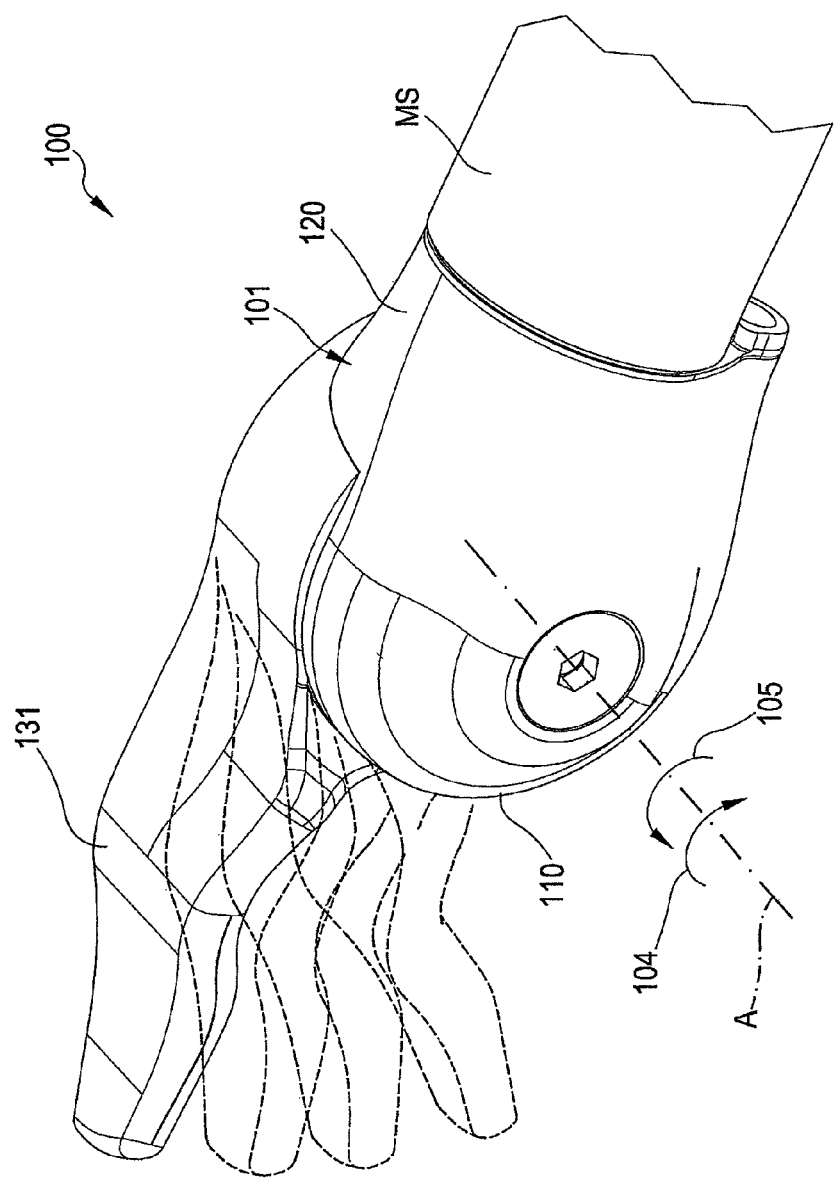
FIG. 1 is a perspective view of a device according to the invention.

The present invention provides a device for controlling a cable associated with a bicycle gearshift. The device has a casing configured for attachment on the end of bicycle handlebars to secure the body of the device. A cable winding bobbin, having an internally toothed crown, is provided in the device's body and a drive mechanism rotates the bobbin in the chosen direction to achieve predetermined angular positions. The drive mechanism includes a lever that is actionable from a neutral position to obtain downward or upward gearshifting is biased toward the neutral position. A ratchet mechanism, located between the lever and the toothed crown, includes opposite rocker arms that pivot parallel axes that are also parallel to the main axis. Each rocker arm has an arched shape cam, such that the arches of the cam profiles curve away from each other, and includes a toothed sector for engaging with the toothed crown. A pointer, that is stationary with respect to the casing, is located to be engaged with at least one of the rocker arms so that it can be engaged and disengaged with a respective cam. A thruster urges the rocker arms toward the neutral position of the pointer whereby engagement of the pointer with a respective cam profile results in the rocker arm's toothed section being away from the toothed crown, and disengagement of the pointer with a respective cam profile results in the rocker arm's toothed section being engaged with the toothed crown.

This device allows the desired operation in which the lever can go back into its neutral position at the end of gearshifting. Indeed, the lever is not directly fixedly connected to the bobbin (or to the toothed crown, non-rotatably mounted to the bobbin), but the ratchet mechanism is arranged between them, which keeps the lever released from the toothed crown with the exception of the moment when gearshifting is commanded. At that moment, according to whether it is downward or upward gearshifting, the angular movement of the lever in one direction or in the other causes a movement of the rocker arms on the lever itself such that one or the other of the two rocker arms is moved on the lever until its toothed sector is taken into engagement with the toothed crown; in this way, the angular movement of the lever is transmitted to the toothed crown and to the cable-winding bobbin. Once the action on the lever by the cyclist has ended, the cable-winding bobbin and the toothed crown are held by the indexing means in the position reached, whereas the lever tends to go back into the neutral position under the action of the elastic means, without the ratchet mechanism opposing it.

Preferably, the thruster is a spring compressed between the second ends of the two rocker arms. Indeed, since the two rocker arms work in opposition to one another, it is sufficient to have a spring suitably arranged between the two rocker arms to generate the desired thrust on each of them, without it thus being necessary to have a spring for each of them.

Preferably, in the neutral position the pointer is engaged with a first portion of the cam profile of both of the rocker arms. In this way, the neutral position—reached thanks to the action of the elastic means—is safely maintained since the engagement of the pointer with both of the cam profiles ensures that neither of the two toothed sectors can go into engagement with the toothed crown.

Preferably, the elastic means comprise a spring acting between the casing and the lever, to take the lever into its neutral angular position. Such a spring can be a simple ring-shaped torsion spring, mounted in the casing coaxially to the main axis (A) of the device and fixedly connected at one end to the casing, at the other to the lever.

Preferably, each of the rocker arms is hinged to the lever by means of a respective pin, formed on the lever, on the rocker arm or structurally independent.

Preferably, the pivot axis of each rocker arm is closer to the first than to the second end of the rocker arm. Maximising the distance between the pivot axis and the toothed sector, which is close to the second end of the rocker arm, allows the thrusting direction of the rocker arm on the toothed sector when the latter is engaged with the toothed crown to be almost the same for all the single teeth of the toothed sector; all of the teeth of the toothed sector thus participate in a substantially equal manner to the thrust. This allows efficient sizing of the toothed sector, which is important since the device must be as light as possible, given its use on racing bicycles.

Preferably, the toothing profile of the toothed sector and of the toothed crown are such as to promote the snap disengagement, one tooth at a time, when the sector moves with the lever going back into its neutral angular position while the toothed crown stays still.

More specifically, the toothing profile of the toothed sector comprises teeth with a thrusting side facing towards the second end of the rocker arm and a release side facing the opposite way, in which the thrusting side is oriented—with reference to a cross section with respect to the main axis (A) of the device—so that a half-line tangent to the thrusting side and oriented towards the outside of the device forms an angle equal to or greater than 90° with a half-line that from the thrusting side points towards the pivot axis of the rocker arm.

Description of the Preferred Embodiments

The figures show an actuation device 100 for the control cable K of a front gearshift of a racing bicycle (not shown). With particular reference to FIG. 1, the device 100 is a so-called bar-end device, mounted at the left end MS of bicycle handlebars of the type used on racing bicycles, and even more specifically specialised bicycles for time trial racing; in such handlebars, the end MS faces forwards, with respect to the direction of forward motion of the bicycle.

The device 100 comprises a casing 101, which is fixed to the handlebars M in a conventional manner, so as to itself be a substantial forward extension of the end MS of the handlebars. The casing 101 comprises a body 110 and a cover 120, fixedly connected to one another through two threaded elements 102 and 103, extending along an axis A. The axis A—as will be made clearer hereafter—is the main reference axis for the elements that form part of the device 100; all indications of directions and the like, such as "axial", "radial", "circumferential" and "diametral", will be made with reference to it; likewise, the indications "outwards" and "inwards" referring to radial directions must be taken as away from the axis A or towards the axis A. Around the axis A, two opposite angular directions are also defined, indicated with 104 and 105, the first in the clockwise direction, the second in the anti-clockwise direction, observing the device 100 as represented in FIGS. 3 and 6-17.

In the casing 101, there is a central pin 111, fixed with respect to the body 110 of the casing 101 and extending along the axis A.

On the pin 111, a cable-winding bobbin 112 is mounted free in rotation; the cable K to be actuated is fixed thereto and wound thereon. The bobbin 112 is connected to the casing 101 by an indexing assembly 113, to hold the bobbin 112 in predetermined angular positions with respect to the casing 101, according to the selected ratio of the gearshift. Such an assembly is per se conventional and is not part of the present invention; therefore, it will not be described in detail hereafter.

A counter-pin 116, mounted on the pin 111 on an axially opposite side of the bobbin 112, completes the rotary assembly of the bobbin 112 in the casing 101.

In the casing 101 there is also a central tang 121, fixed with respect to the cover 120 of the casing 101 and extending along the axis A. An annular element 122 is mounted on the tang 121—non-rotatably fixed thereto.

The device 100 also comprises a drive mechanism, to obtain downward or upward gearshifting, generally indicated with 130, acting on the bobbin 112 to rotate it in the angular directions 104 and 105 around the axis A.

The drive mechanism 130 comprises an internally toothed crown 114, non-rotatably mounted to the bobbin 112, and a lever 131, that can be actuated by the cyclist and is angularly mobile with respect to the casing 101 around the axis A, in the angular directions 104 and 105 from a neutral position (shown in FIGS. 1, 4, 5, 6, 12, 18). The lever 131 is rotatably supported by means of a bush 132 mounted on the tang 121, at the side of the annular element 122, and elastic means (in particular a spring 133) acting between the casing 101 and the lever 131, to take the lever 131 into its neutral angular position.

The drive mechanism also comprises a ratchet mechanism 140 between the lever 131 and the toothed crown 114.

The ratchet mechanism 140 comprises two opposite and symmetrically identical rocker arms 141 and 142, hinged on an side of the lever 131 through two pins 134, 135 arranged according to pivot axes B and C that are parallel to one another and to the main axis A of the device 100. Each of the rocker arms 141 and 142 has an arched shape, wrapping around the axis A, extending from a first end 143, 144 to a second end 145, 146; the first end 143 of the first rocker arm 141 is close to the first end 144 of the second rocker arm 142, whereas the second end 145 of the first rocker arm 141 faces towards the second end 146 of the second rocker arm 142, spaced from it in the substantially tangential direction with respect to the axis A.

On each rocker arm 141, 142, a respective toothed sector 147, 148 is formed, formed on an outer side of the rocker arm 141, 142, close to the second end 145, 146. The toothed sector 147, 148 has a toothing profile suitable for engagement with the toothing of the toothed crown 114. The toothed crown 114 and the rocker arms 141, 142 are substantially in the same axial position along the axis A, and therefore the toothed crown 114 is in a position in front of the toothed sectors 147, 148.

Again on each rocker arm 141, 142, a respective cam profile 151, 152 is formed, formed on an inner side of the rocker arm 141, 142, adjacent to the first end 143, 144. The cam profile 151, 152 comprises a main portion 153, 154 extending substantially in the circumferential direction around the axis A, preceded by a greatly inclined short first portion 155, 156, adjacent to the first end 143, 144 of the rocker arm 141, 142.

Figure 2:
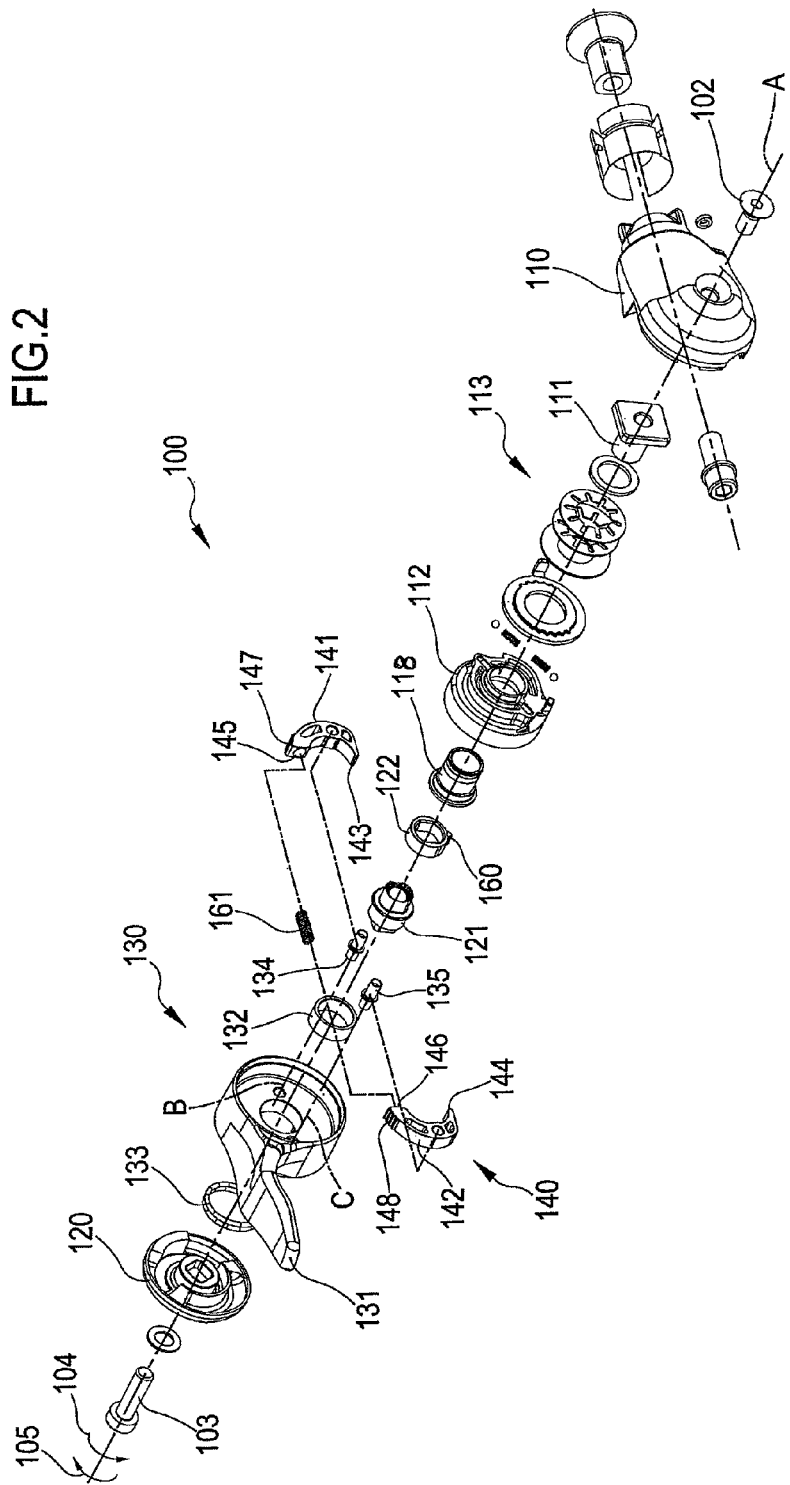
FIGS. 2 and 3 are exploded perspective views of the device of FIG. 1.
Figure 3:
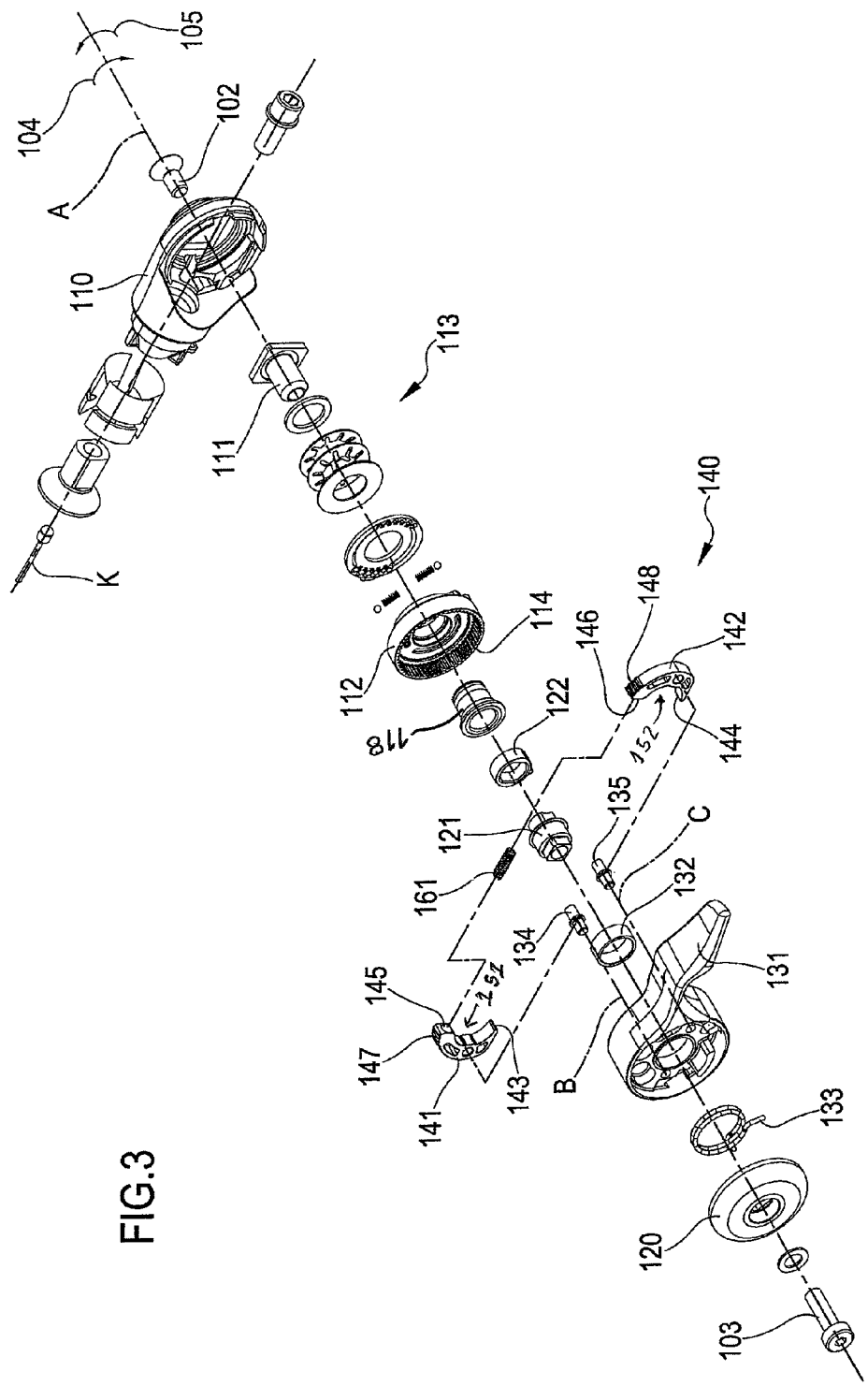
Figure 4:
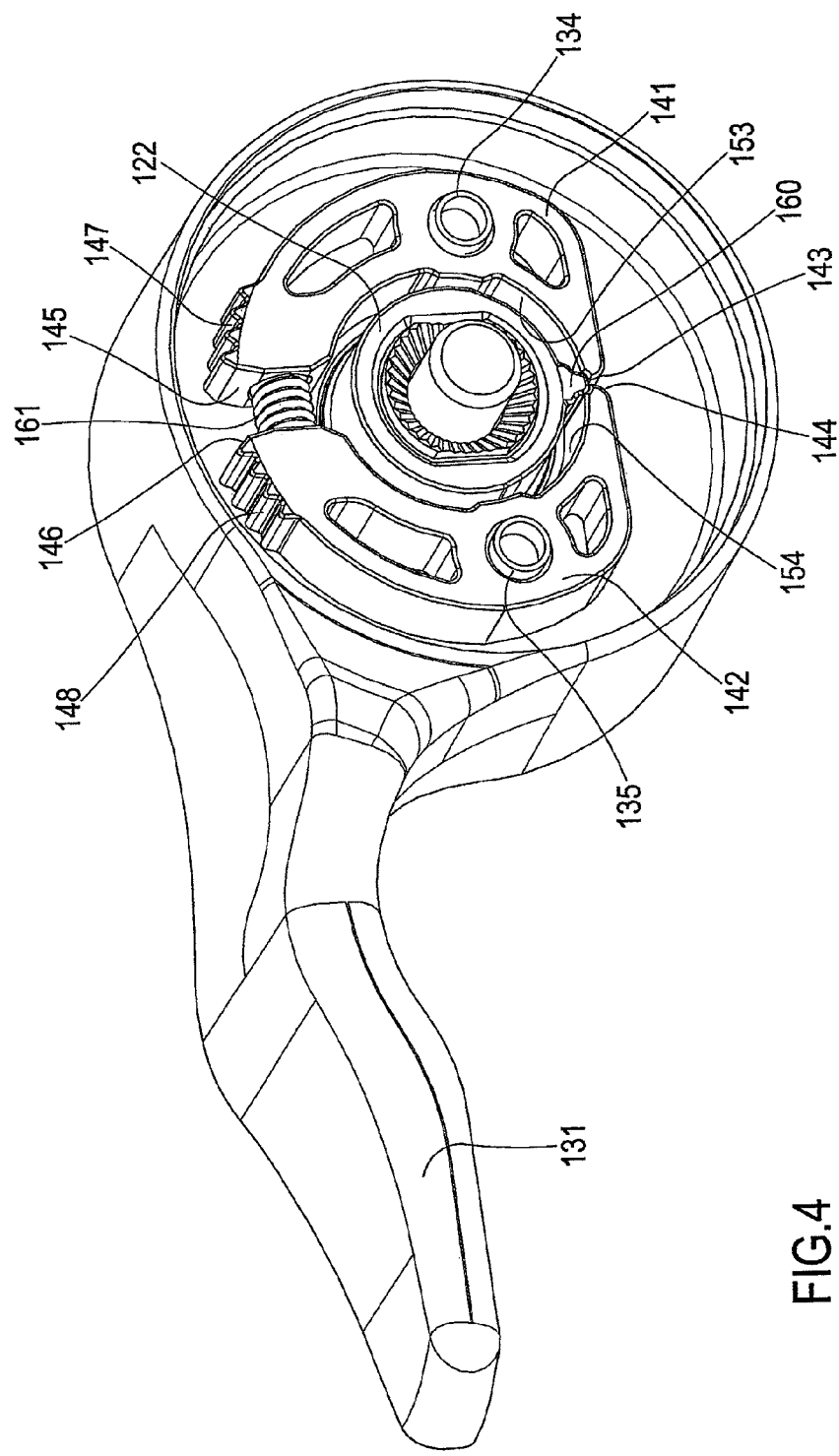
FIG. 4 is a perspective view of a part of the device of FIG. 1.
Figure 5:
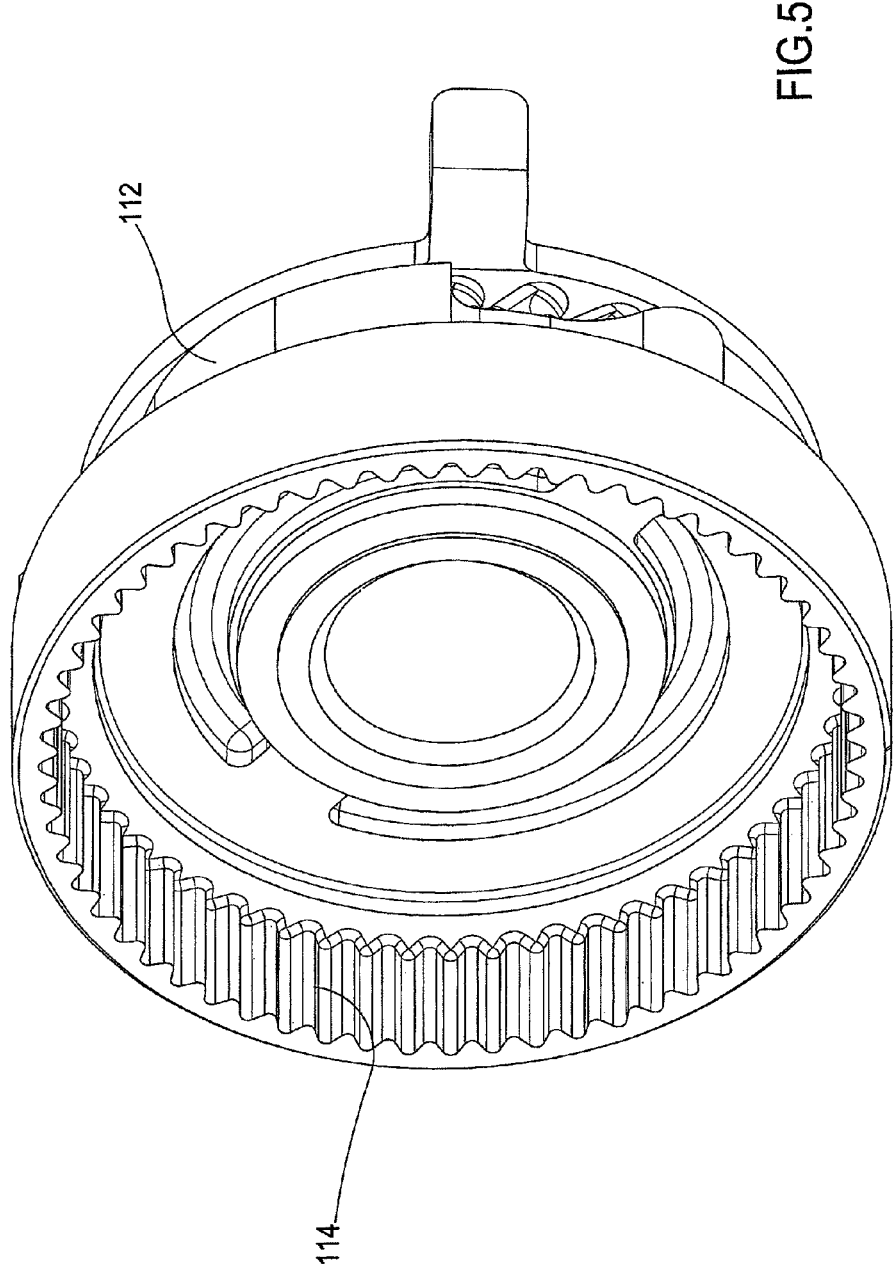
FIG. 5 is a perspective view of another part of the device of FIG. 1.

The cam profiles 151, 152 are in contact engagement—according to the operating steps, which will be discussed later—with a pointer 160, formed from an outer projection on the annular element 122, see FIGS. 2 and 6, extending parallel to the axis A; the pointer 160 is stationary with respect to the casing 101 and faces radially outwards with respect to the axis A.

The ratchet mechanism 140 also comprises a thruster 161, to thrust each rocker arm 141, 142 around its pivot axis B, C, in the direction to push the second ends 145, 146 of the rocker arms 141, 142 away from the axis A. Preferably, the thruster 161 is a spring, compressed between the second ends 145, 146 of the rocker arms 141, 142.

Each cam profile 151, 152 is configured so that:
  when the pointer 160 is engaged with the cam profile 151, 152 of a rocker arm 141, 142, the toothed sector 147, 148 of the same rocker arm is kept away from the toothed crown 114;
  when the pointer 160 is disengaged from the cam profile 151, 152 of a rocker arm 141, 142, the toothed sector 147, 148 of the same rocker arm is thrusted into engagement with the toothed crown 114 by the thruster 161.

Given the proximity of the first ends 143, 144 of the rocker arms 141, 142, the pointer 160 is always engaged with at least one of the rocker arms 141, 142, on its cam profile 151, 152; in the neutral position of the lever 131, the pointer 160 is engaged with the first portion 155, 156 of the cam profiles 151, 152 of both of the rocker arms 141, 142.

The rocker arms 141, 142 are shaped and sized so that the pivot axis B, C of each rocker arm 141, 142 is closer to the first end 143, 144 than to the second end 145, 146 of the rocker arm itself.

The toothing profile of the toothed sector 147, 148 and of the toothed crown 114 are such as to promote the snap disengagement, one tooth at a time, when the toothed sector 147, 148 moves with the lever 131 going back into its neutral position while the toothed crown 114 stays still.

More specifically, the toothing profile of the toothed sector 147, 148 comprises teeth 157, 158 with a thrusting side 157a, 158a facing towards the second end 145, 146 of the rocker arm 141, 142 and a release side 157b, 158b facing the opposite way. The thrusting side 157a, 158a is oriented—with reference to a cross section with respect to the axis A—so that a half-line D1 tangent to the thrusting side 157a, 158a and oriented towards the outside of the device 100 forms an angle α equal to or greater than 90° with a half-line D2 that from the thrusting side 157a, 158a points towards the pivot axis B, C of the rocker arm 141, 142.

The operation of the device 100 will now be described with reference in particular to FIGS. 6-18; it should be noted that every angular movement of the toothed crown 114 corresponds to an identical angular movement of the cable-winding bobbin 112 and thus to a gearshifting.

Figure 6:
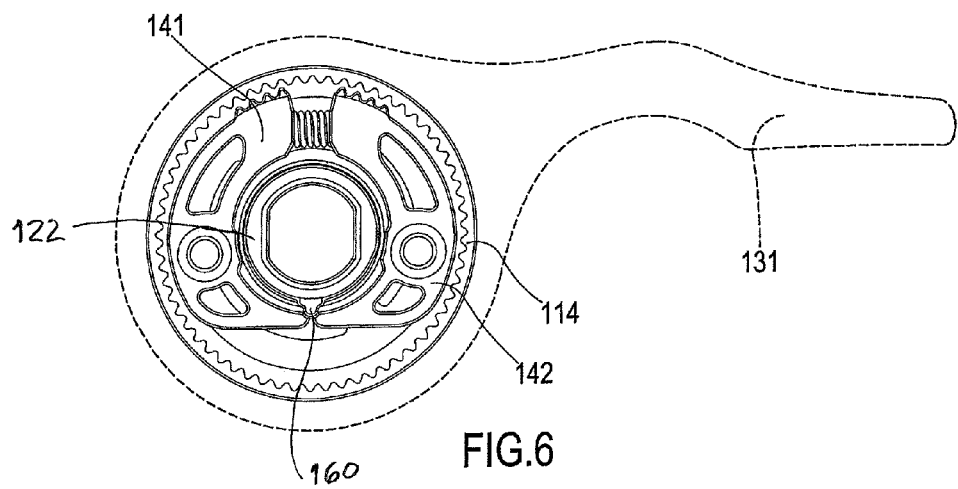
FIGS. 6 to 18 are a series of plan views showing successive positions during the operation of the device; and, FIG. 19 is a plan view with a partial section.

FIG. 6 shows the neutral position of the lever 131, which corresponds to a non-gearshifting situation, with the gearshift having a certain ratio and keeping it. In this position, as already stated, the pointer 160 is engaged with the first portion 155, 156 of the cam profiles 151, 152 of both of the rocker arms 141, 142. No toothed sector 147, 148 is engaged with the toothed crown 114.

Figure 7:
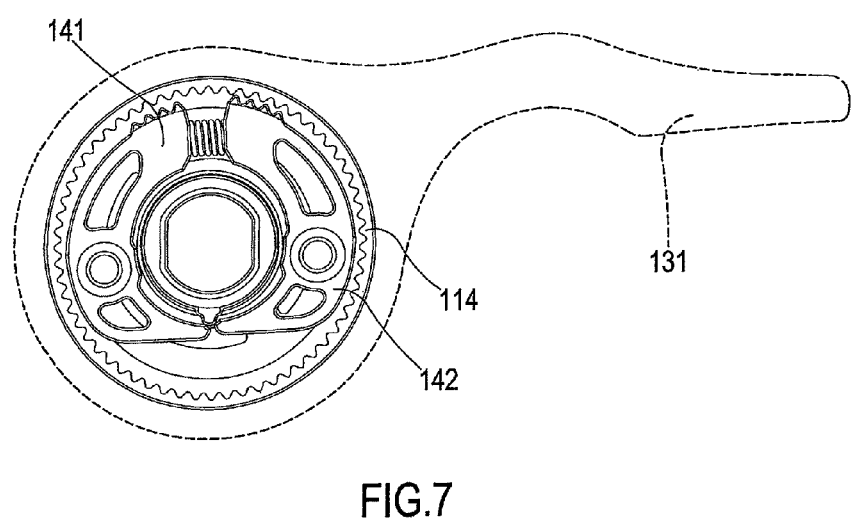

From this position, the lever 131 is moved by the cyclist in the direction 105. As shown in FIG. 7, as soon as the lever 131 has reached a minimum angular movement, the pointer 160 disengages from the cam profile 152 of the rocker arm 142, which is thus thrusted by the thruster 161 with the toothed sector 148 towards the toothed crown 114.

Figure 8:
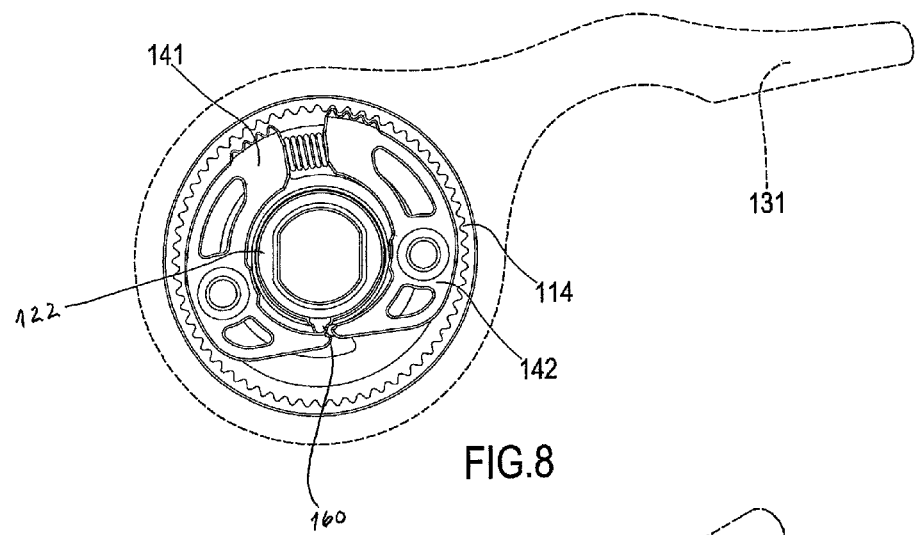
Figure 9:
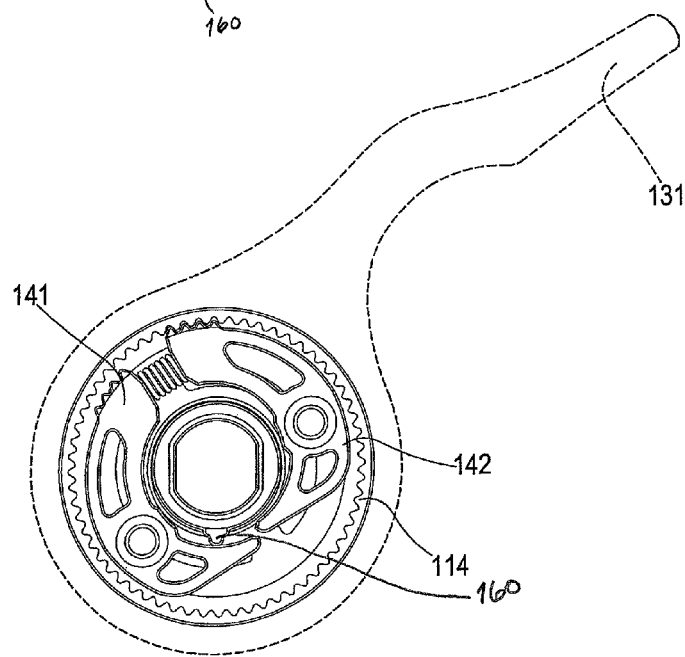
Figure 10:
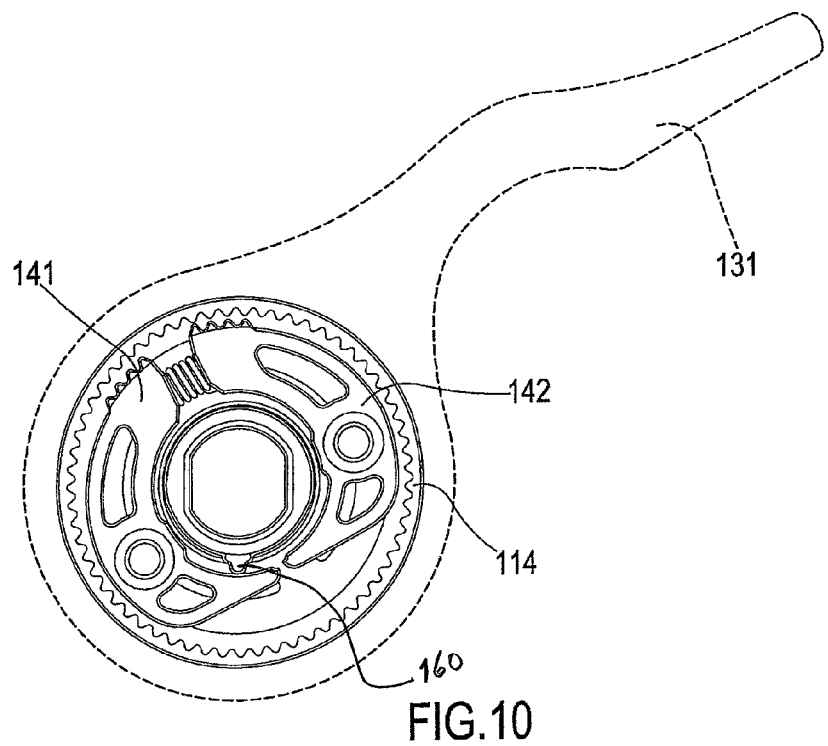

As the movement of the lever 131 proceeds, as shown in FIGS. 8 and 9, the engagement of the toothed sector 148 with the toothed crown 114 ensures that the toothed crown moves angularly together with the lever 131. This movement will thus be continued by the cyclist until the angular position corresponding to the gearshifting that is wanted is reached; indeed, it is possible to move the lever 131 by a small angle to obtain single gearshifting (going to an immediately greater or smaller ratio), as well as by a greater angle, corresponding to multiple gearshifting (double, triple or even more).

Figure 11:
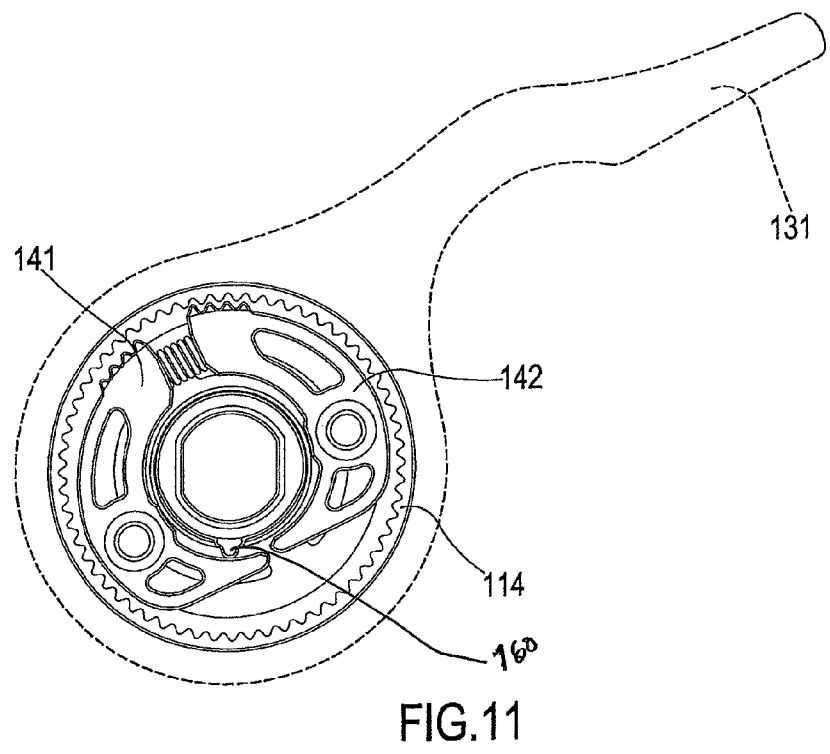
Figure 12:
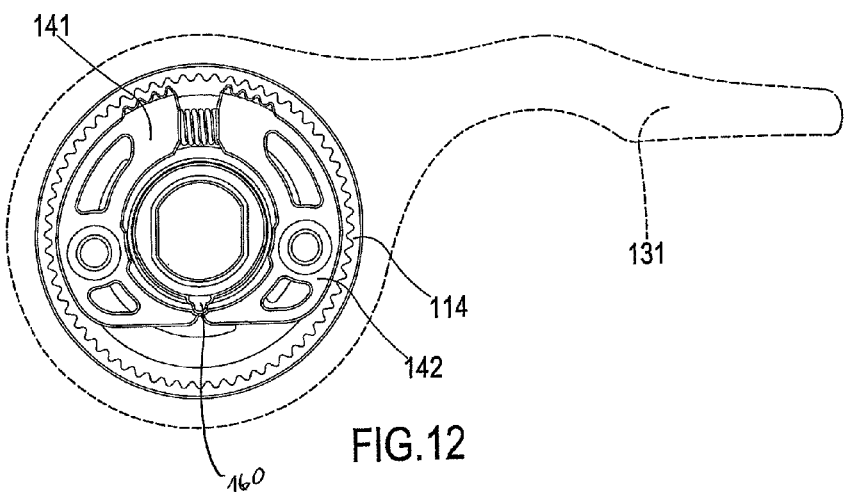
Figure 13:
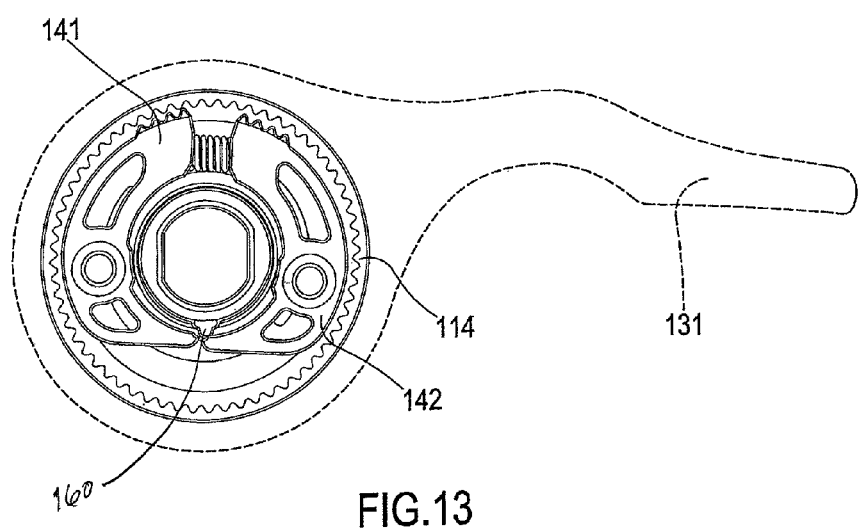
Figure 14:
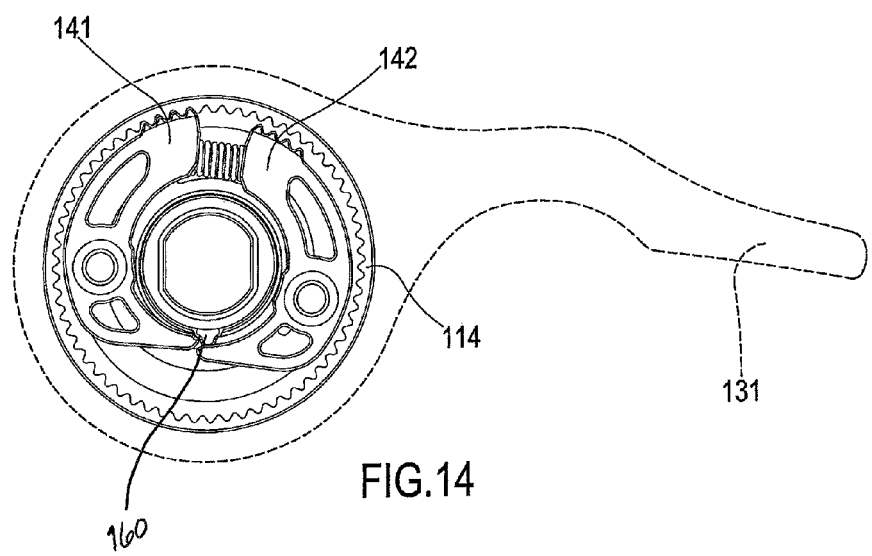
Figure 15:
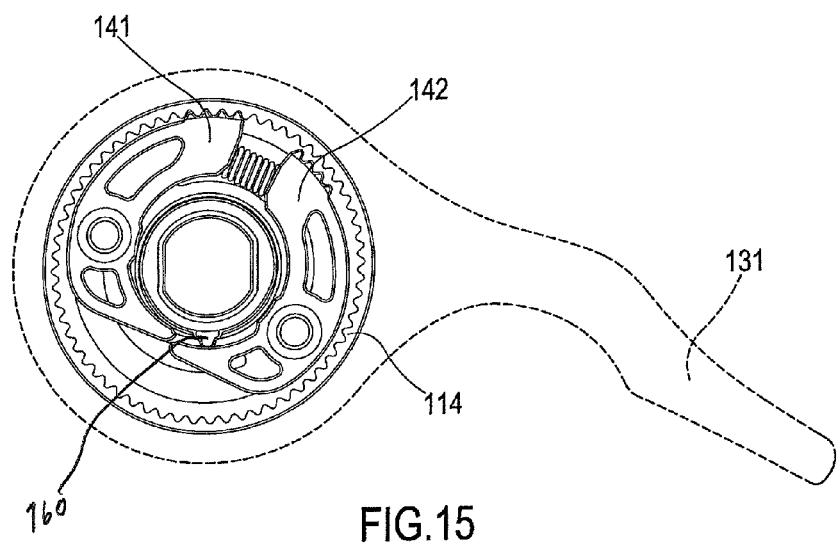
Figure 16:
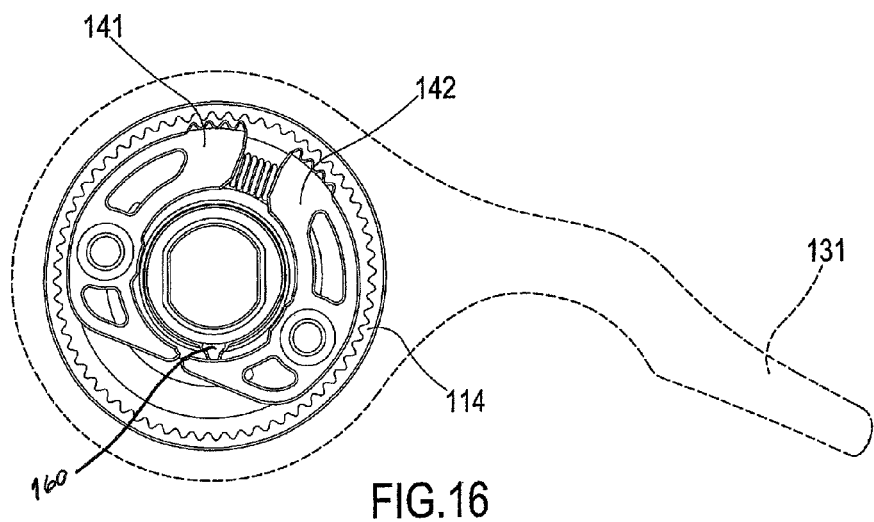
Figure 17:
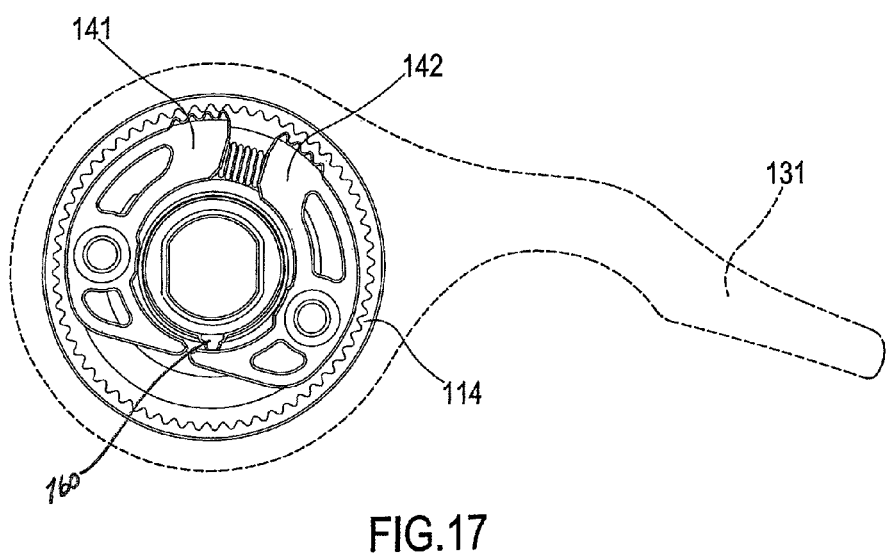
Figure 18:
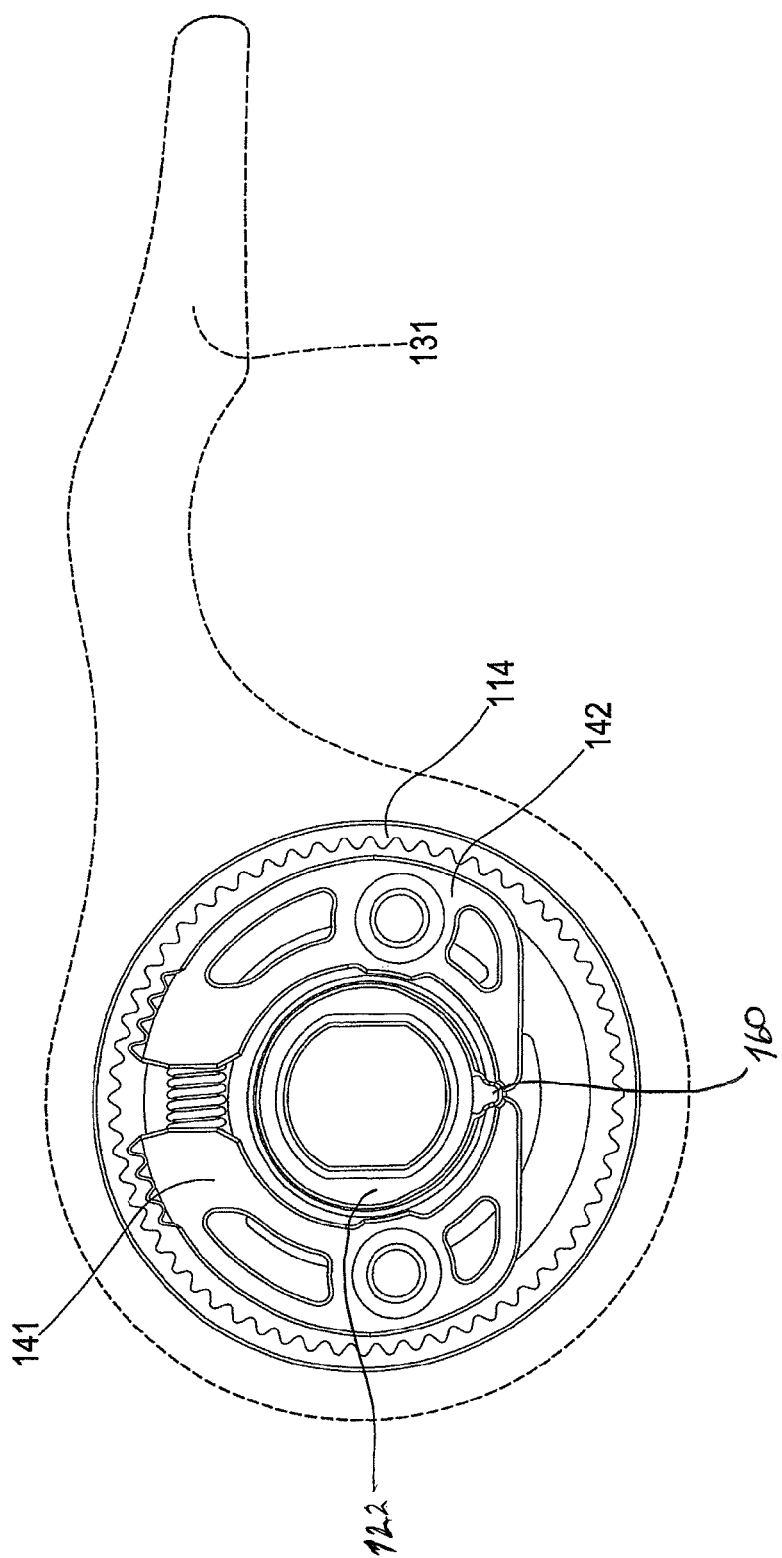
Figure 19:
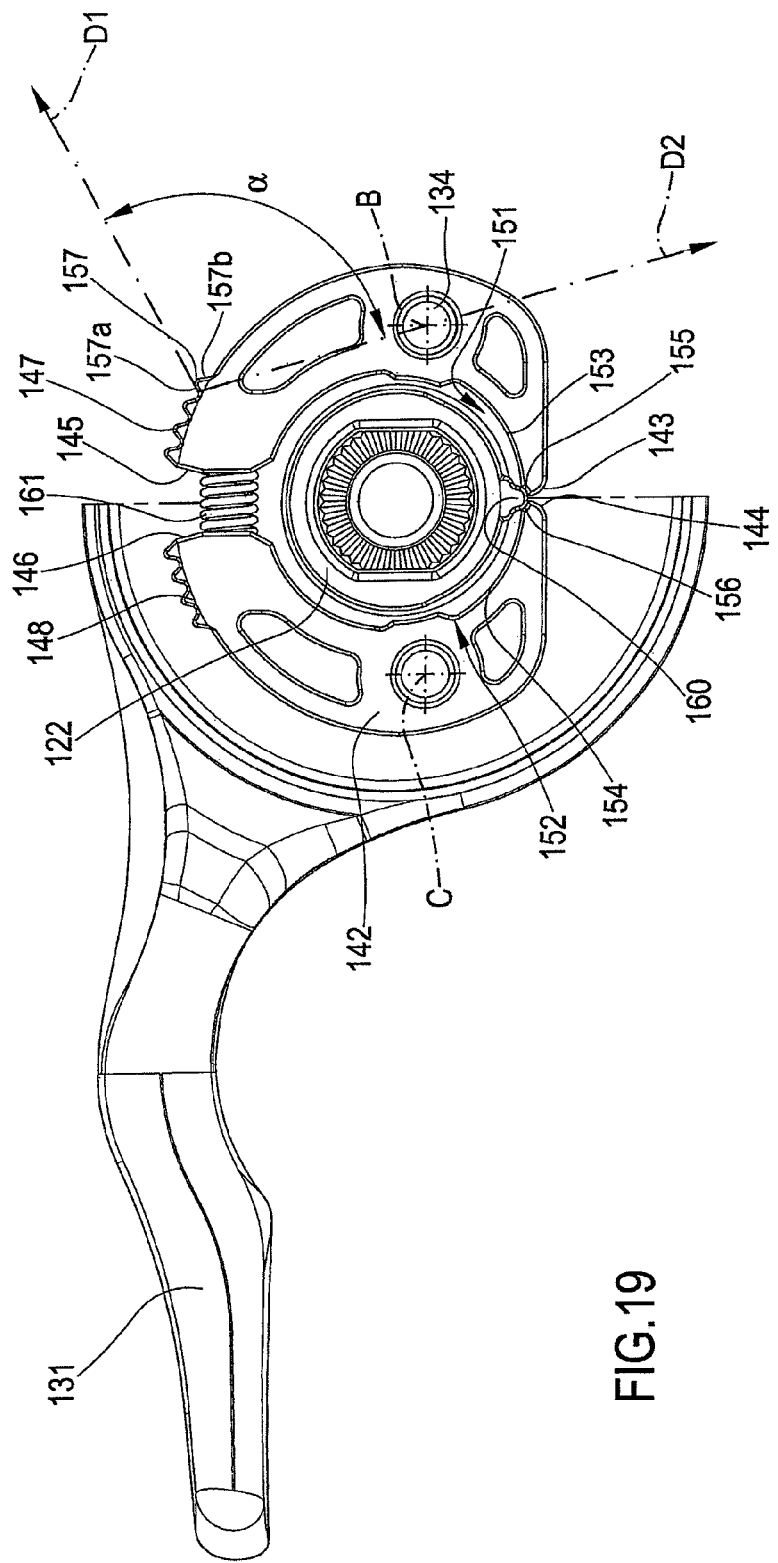

Once the desired angular position has thus been reached, the cyclist interrupts the thrust on the lever 131 and leaves it. While the toothed crown 114 is kept still in the angular position reached by the indexing assembly 113, the lever 131 that has been left free tends to be brought back towards its neutral position by the action of the spring 133 (FIG. 10); the lever 131 thus starts to move in the angular direction 104. Given the geometry of the teeth 158 and of the rocker arm 142, and also given the non-engagement of the pointer 160 in the cam profile 152, the rocker arm 142 can rotate in the anti-clockwise direction around the pivot axis C (overcoming just the elastic force of the thruster 161), thus disengaging its toothed sector 148 from the toothed crown 114 (FIG. 11). In practice, the toothed sector 148 rides over the teeth of the toothed crown one by one, until the lever 131 goes back into the neutral position (FIG. 12).

Eventually, gearshifting has been carried out, single or multiple, and at the end the lever 131 is back into its neutral starting position, ready for more gearshifting, in the same or other direction. FIGS. 13 to 18, similarly to FIGS. 7-12, show gearshifting in the opposite direction; given the total symmetry of operation, these steps will not be described.

Of course, a man skilled in the art can bring modifications and variants to what has been described, without departing from the scope of protection defined by the following claims.

The invention claimed is:
1. An actuation device for a control cable for a bicycle gearshift, comprising:
  a casing, configured for attachment on an end of a handlebar of the bicycle,
  a bobbin on which to wind the cable, angularly mobile in the casing around a main axis of the device, a drive mechanism, acting on the bobbin to rotate the bobbin in a first and in a second angular direction around the main axis of the device, indexing means to removably hold the bobbin in predetermined angular positions, the drive mechanism comprising:

a lever that is biased towards a neutral position, angularly mobile with respect to the casing around the main axis of the device, in the first or in the second angular direction from the neutral position to obtain downward or upward gearshifting, an internally toothed crown, non-rotatably mounted to the bobbin and angularly mobile in the casing, elastic means acting between the lever and the casing that bias the lever into the neutral position, and a ratchet mechanism between the lever and the toothed crown that comprises:

two opposite rocker arms, hinged on the lever according to two pivot axes parallel to one another and to the main axis of the device, each of said rocker arms having an arched shape wrapping around the main axis of the device and extending from a first end to a second end, wherein the first end of the first rocker arm is proximal to the first end of the second rocker arm and the second end of the first rocker arm faces towards the second end of the second rocker arm, a toothed sector, formed on each rocker arm on an outer side thereof, proximal to the respective second end, said sector having a toothing profile for engaging the toothing of the toothed crown, wherein the crown is in an axial position corresponding to that of the toothed sectors along the main axis of the device, a cam profile, formed on each rocker arm on an inner side thereof, adjacent to the respective first end, a thruster to thrust each rocker arm around a pivot axis of the rocker arm to thrust the second end of each of the rocker arms away from the main axis of the device, a pointer that is stationary with respect to the casing and facing radially outwards with respect to the main axis of the device, engaged with at least one cam profile on the rocker arms, each cam profile is configured such that:

when the pointer is engaged with the cam profile of one of the rocker arms, the toothed sector of the one rocker arm is positioned away from the toothed crown, and when the pointer is disengaged from the cam profile, the toothed sector of the one rocker arm is thrust into engagement with the toothed crown by the thruster.

2. The actuation device according to claim 1, wherein the thruster is a spring that is compressed between the second end of each of the two rocker arms.

3. The actuation device according to claim 1, wherein when the lever is in the neutral position the pointer is engaged with a first portion of the cam profile of both of the rocker arms.

4. The actuation device according to claim 3, wherein the elastic means comprise a spring acting between the casing and the lever to take the lever into the neutral position.

5. The actuation device according to claim 1, wherein each of the rocker arms is hinged to the lever by a respective pin.

6. The actuation device according to claim 1, wherein the pivot axis of each rocker arm is positioned closer to the first end of each rocker arm than the second end of each rocker arm.

7. The actuation device according to claim 1, wherein the toothing profile of the toothed sector and of the toothed crown promote snap disengagement, one tooth at a time, when the toothed sector moves with the lever back into the neutral position of the lever while the toothed crown remains stationary.

8. The actuation device according to claim 7, wherein the toothing profile of the toothed sector comprises teeth with a thrusting side facing towards the second end of each rocker arm and an oppositely situated release side, in which the thrusting side is oriented with reference to a cross section with respect to the main axis of the device so that a first half-line tangent to the thrusting side and oriented towards the outside of the device forms an angle greater than or equal to 90° with a second half-line from the thrusting side that points towards the pivot axis of each rocker arm.

9. An actuation device for controlling a cable associated with a bicycle gearshift comprising:

a casing configured for attachment on an end of a bicycle handlebar to secure a body of the device;

a cable winding bobbin mounted within the casing and having an internally toothed crown;

an indexer that holds the bobbin in a predetermined angular position;

a drive mechanism that includes a lever that is actionable from a neutral position to obtain downward or upward gearshifting and rotates the bobbin to achieve the predetermined angular position;

a ratchet mechanism, located between the lever and the toothed crown, that includes opposite rocker arms that comprise arched cams with profiles that curve away from each other, and a toothed sector on each respective rocker arm for engaging the toothed crown;

a pointer that is stationary with respect to the casing and is selectively engaged by both of the rocker arms;

a thruster that urges each of the rocker arms towards respective neutral positions with respect to the pointer;

whereby engagement between a respective cam profile and the pointer causes one rocker arm's toothed sector to move away from the toothed crown, and the other rocker arm's toothed sector to move toward engagement with the toothed crown.

\* \* \* \* \*